United States Patent [19]

Newman

[11] 4,164,190

[45] Aug. 14, 1979

[54] SEED PLANTING METHOD FOR CEREAL GRAINS AND GRASSES

[76] Inventor: Dwight C. Newman, R.R. 1, Culver, Ind. 46511

[21] Appl. No.: 736,894

[22] Filed: Oct. 29, 1976

[51] Int. Cl.² .......................... A01C 5/00; A01B 29/00
[52] U.S. Cl. .......................................... 111/1; 111/89; 111/DIG. 1; 172/537; 172/554
[58] Field of Search ................. 111/89, DIG. 1, 1, 10, 111/13, 52; 172/537, 554

[56] References Cited

U.S. PATENT DOCUMENTS

| 281,677 | 7/1883 | Evinger | 111/66 X |
| 529,492 | 11/1894 | Hill et al. | 111/DIG. 1 |
| 654,548 | 7/1900 | Latisniere | 111/DIG. 1 |
| 1,340,654 | 5/1920 | Griswold et al. | 111/54 |
| 1,914,915 | 6/1933 | Handler | 111/89 X |
| 2,146,222 | 2/1939 | Pace | 111/99 X |

FOREIGN PATENT DOCUMENTS

| 6855 | 8/1879 | Fed. Rep. of Germany | 111/89 |
| 331316 | 7/1903 | France | 111/52 |
| 1481 | of 1860 | United Kingdom | 172/554 |
| 21965 | of 1914 | United Kingdom | 111/DIG. 1 |

OTHER PUBLICATIONS

Holliday, R.; "The Effect of Row Width on the Yield of Cereals", *Field Crop Abstracts*, pp. 71-81, vol. 16, No. 2, 5/63.

*Primary Examiner*—Clifford D. Crowder
*Attorney, Agent, or Firm*—Garrettson Ellis

[57] ABSTRACT

A method for planting seeds in a pattern comprising longitudinal and transverse rows of seed planting sites, in which the transverse rows cross the longitudinal rows, the improvement comprising: planting the seeds with a seed-to-seed spacing of 1 to 3½ inches along both the longitudinal and transverse rows, preferably in an approximately square, equidistant pattern. The equidistant spacing, in contrast with row-type spacing where plants are spaced relatively far apart in one direction and close together in the other direction, provides a significant improvement in the growth of the plants, and particularly encourages "stooling" or multiple sprouting of cereal grains and grasses.

18 Claims, 3 Drawing Figures

U.S. Patent  Aug. 14, 1979  4,164,190
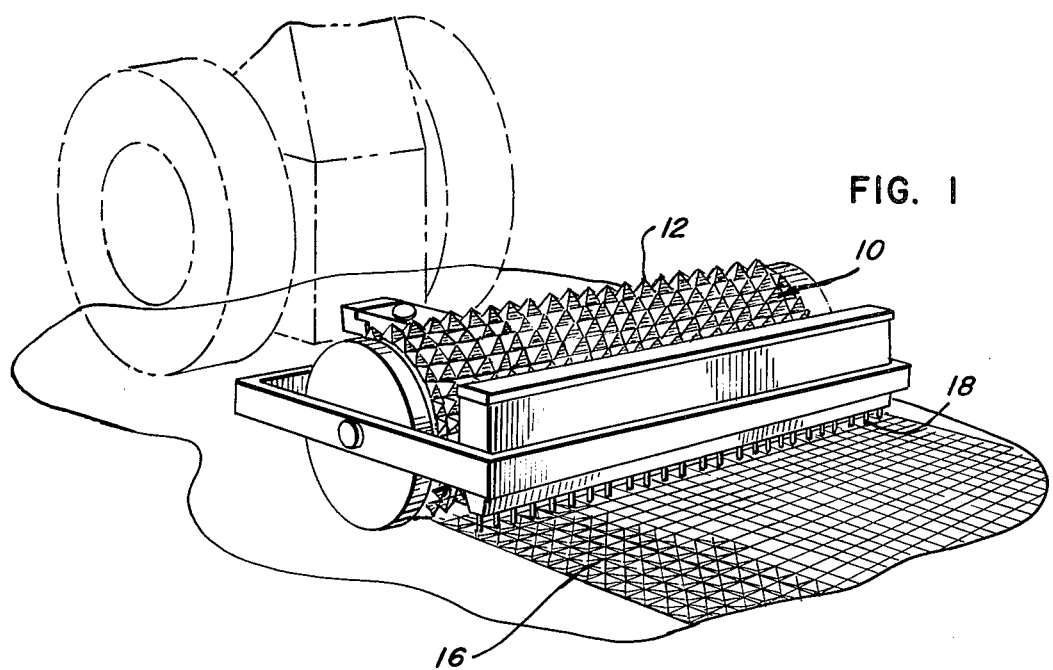
FIG. 1
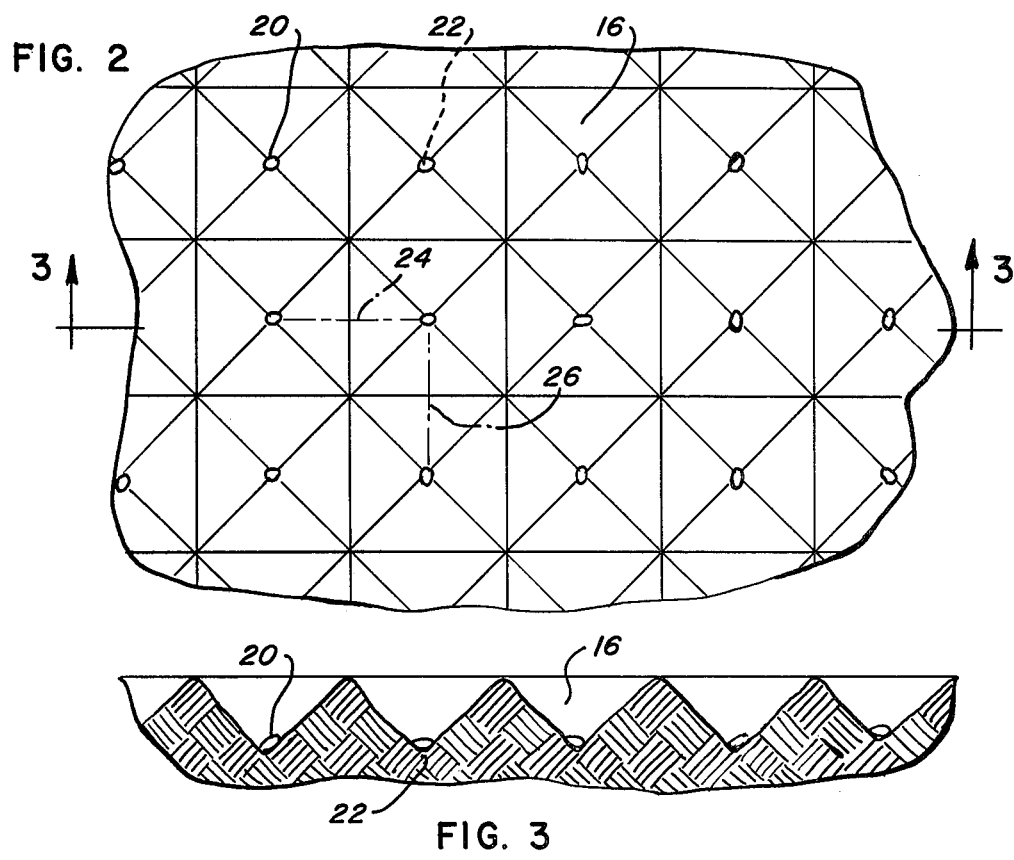
FIG. 2
FIG. 3

SEED PLANTING METHOD FOR CEREAL GRAINS AND GRASSES

BACKGROUND OF THE INVENTION

Cereal grains such as wheat, barley, oats, rye or rice are conventionally planted by either broadcasting the seeds into a plowed field, or planting them in rows spaced, for example, 6 to 8 inches apart. One conventional planting density for wheat is 1½ bushels of seeds per acre, which corresponds, in the case of six-inch rows, to a seed spacing along the rows of about ⅝ of an inch on a center-to-center basis. For seven-inch rows, such a planting density corresponds to a spacing along the row of 0.57 inch, and for eight-inch rows such a planting density results in a spacing along the row of ½ inch.

Customarily, the average stooling, or sending up of additional shoots, will be between two or three shoots per plant in planting configurations of the above types.

Similarly, with broadcasting of seeds into a field, while on the average the wheat may be uniformly distributed over the field, in any particular small area, the seeds will be quite nonuniformly distributed, bunching together in one small area and being widely dispersed in another.

As a result of this, the various grasses and cereal grains are not as productive as they might otherwise be.

DESCRIPTION OF THE INVENTION

In accordance with this invention, seeds of cereal grains or grasses may be uniformly planted along a plurality of longitudinal and transverse rows in a checkerboard-type pattern or the like, with the transverse rows of seeds crossing the longitudinal rows, preferably so that there is little or no difference in the spacing of the seeds in both of the two dimensions defined by the crossing rows, unlike row-type planting or broadcasting of the seeds. In this invention, the seed-to-seed spacing along each of the two crossing rows is from 1 to 3½ inches, preferably providing an equidistantly spaced square, or diamond-shaped, pattern of seed distribution, in which the seed sites occupy the various corners of the repeating square or diamond-shaped array of seed sites.

In this particular planting configuration, it is expected that each seed will be greatly stimulated to send up a multitude of stools or sprouts, rather than merely two or three, while providing a better shape of free soil area for the roots of the individual plants, resulting in an increased yield of crop on a per-acre basis over that which is conventional.

It is contemplated, for example, to utilize this invention with cereal grains such as wheat, barley, oats, rye or rice; and other grasses such as bluegrass, millet, Timothy, and the like. Also, this invention can be used with legumes, particularly when used for hay, such as alfalfa, sweet clover, lespedeza, soybeans, cowpeas, vetch and others, as well as other crops such as buckwheat, flax, and other miscellaneous forage and crops, herbs, and the like, including mint, dill, and other industrial crops. It is generally preferred when using grasses such as those mentioned above to limit the seed spacing in accordance with this invention to about two inches or less. However, if a grass such as sorghum is to be planted, the seed spacing would then be expected to be about 3 to 3½ inches, preferably.

With respect to wheat and other cereal grains, it is generally preferred to utilize a seed spacing in both dimensions as described above of about 1½ to 3 inches. Particularly, the range of 1½ to 2½ inches is believed to be desirable.

Referring to the drawings,

FIG. 1 is a perspective view of the planting method of this application in a process of being performed with planting apparatus which is schematically shown.

FIG. 2 is an enlarged, plan view illustrating a planting pattern on the ground provided in accordance with this invention.

FIG. 3 is a sectional view taken along line 3—3 of FIG. 2.

As shown in FIG. 1, roller 10, which carries a plurality of shaped studs or projections 12, is rolled through a prepared field, leaving behind an array of shallow holes or depressions 16 in the ground of the field to be planted, in which the depressions are arranged in the desired array in which the seeds are to be planted. Preferably, the depressions are placed directly adjacent one another, with a minimum of spacing between them, to cover the great majority of the planting area.

Immediately after rolling, a suitable seed drop device such as an array of seed delivery tubes 18 may be provided to drop seeds 20 in each of the array of holes. Because of the hole spacing, virtually all of the seeds, even if dropped in a continuous, uncontrolled stream, fall into the depressions or holes 16. If desired, a light dragging object (not shown) such as a piece of canvas or the like may follow the roller and the seed tubes 18 to lightly cover the cereal grains or grass seeds with dirt. The holes 16 may preferably be from about ¼ to 3 inches deep, depending on the type of seed and the like. The depth of holes 16 is governed by the height of protrusions 12.

It is generally preferred for the shape of each hole, which may be impressed in the ground by any desired means, to be in the shape of an inverted pyramid, as shown, or a cone or the like corresponding of course to the shape of protrusions 12. Thus, the bottom of each hole is of a variable depth across its width, defining an apex 22 of maximum depth in the hole. The pattern of apexes of the holes are positioned, by suitable positioning of the projections 12 on the roller, so that each apex area occupies the desired position of each seed planting site. Thus, as the seed strikes the hole, it tends to roll toward the apex and be spontaneously positioned at the desired seed planting site.

As a result, a newly-planted field in accordance with this invention may exhibit a "waffle" pattern, in which an array of uniformly and closely spaced holes each carry a seed at the bottom thereof, precisely positioned by the sloping walls of the hole. After the canvas drag or any other desired hole closing means has been passed over the holes, the seeds preferably remain slightly covered with dirt in the remainder of holes 16, to be protected as tiny seedlings from the effects of high wind and the like in their first few days of growth.

In particular, it is contemplated that wheat seeds or other seeds may be planted in an equidistant square pattern in which each of the seed sites defines corners of a lattice of interconnected squares, like a checkerboard, with the longitudinal row spacing 24 and the transverse row spacing 26 being identically, for example, 1½, 2 or 2½ inches. A substantial increase in the overall wheat yield per acre is expected from this planting pattern, since room for a significant increase in stooling of the wheat plants is provided.

The above has been offered for illustrative purposes only, and is not for the purpose of limiting the invention of this application, which is as defined in the claims below.

That which is claimed is:

1. The method of planting seeds of cereal grains in a pattern comprising a plurality of longitudinal and transverse rows of seed planting sites, the transverse rows crossing the longitudinal rows, the improvement comprising, in combination: impressing a series of separate depressions in the ground in which each depression defines a generally variable depth, tapering to an apex area of maximum depth, in which the depressions have essentially common base sides at the ground surface with each adjacent depression along both the transverse rows and longitudinal rows, said apexes of the depressions being positioned in said longitudinal and transverse rows, and being spaced from 1½ to 2½ inches apart along said longitudinal rows and 1½ to 2½ inches apart along said transverse rows so as to be essentially equally spaced in both directions along said longitudinal and transverse rows; and thereafter placing cereal grain seed into said depressions, whereby said cereal grain seeds tend to be positioned adjacent the apexes of the depressions, to be spaced from each other in a manner corresponding to the spacing of said apexes.

2. The method of claim 1 in which the ground walls defining said depressions all extend upwardly to the ground level.

3. The method of claim 1 in which, after the seeds are placed in the depressions, the seeds are covered with dirt.

4. The method of claim 1 in which said seeds are wheat seeds.

5. The method of claim 1 in which said longitudinal and transverse rows are essentially perpendicular to each other.

6. The method of claim 5 in which said spacing of the apexes and seeds is essentially 2 inches.

7. The method of claim 1 in which, after placing said seeds in the depressions, said seeds are covered with dirt.

8. A method of planting seeds of plants selected from the group consisting of cereal grains and grasses in a pattern comprising a plurality of longitudinal and transverse rows of seed planting sites, the transverse rows crossing the longitudinal rows, the improvement comprising, in combination: impressing on the ground a series of separate depressions, said depressions defining the shape of an array of inverted pyramids, each depression defining a downwardly pointing apex and having essentially common base sides at the ground surface with each adjacent depression in both the transverse rows and longitudinal rows, the apexes of said depressions being spaced one to 3½ inches apart along said longitudinal rows and one to 3½ inches apart along said transverse rows so as to be essentially equally spaced in both directions along said longitudinal and transverse rows, and placing said seeds in said depressions, whereby said seeds tend to be naturally positioned adjacent the apexes of said depressions to achieve a seed spacing corresponding to said spacing of said apexes.

9. The method of claim 8 in which said spacing along the rows is from 1½ to 2½ inches.

10. The method of claim 9 in which said seeds are wheat seeds.

11. The method of claim 8 in which the ground walls defining said depressions all extend upwardly to the ground level.

12. The method of claim 8 in which said seed planting sites are no nearer to each other than 1½ inches.

13. The method of claim 8 in which said transverse and longitudinal rows are essentially perpendicular to each other.

14. The method of claim 8 in which said apex and seed-to-seed spacing are from 1½ to 3 inches.

15. Apparatus for planting seeds which comprises a roller member, a plurality of projections positioned on said roller member, the projections being arranged in a pattern defining longitudinal rows and transverse rows on the roller member in which the transverse rows cross the longitudinal rows, said projections further defining apexes and essentially common base sides with adjacent projections in both the transverse and longitudinal rows, the apexes of said projections being essentially equally spaced in both directions along said longitudinal rows from 1 to 3½ inches apart and along said transverse rows from 1 to 3½ inches apart, and means for placing seeds into depressions formed in the ground by the projections rolling over the ground.

16. The apparatus of claim 15 in which the apexes of said projections are spaced from 1½ to 2½ inches apart.

17. The apparatus of claim 15 in which said projections are pyramidal in shape.

18. The apparatus of claim 17 in which said longitudinal and transverse rows are essentially perpendicular to each other.

* * * * *